United States Patent [19]

Kitada

[11] Patent Number: 4,618,778

[45] Date of Patent: Oct. 21, 1986

[54] RADIOGRAPHIC INTENSIFYING SCREEN

[75] Inventor: Akira Kitada, Kaisei, Japan

[73] Assignee: Fuji Photo Film Co., Ltd., Japan

[21] Appl. No.: 617,978

[22] Filed: Jun. 6, 1984

[30] Foreign Application Priority Data

Jun. 7, 1983 [JP] Japan ................................ 58-100184

[51] Int. Cl.$^4$ ........................ G01J 1/58; G01N 21/64; G01T 1/00

[52] U.S. Cl. .................................................. 250/483.1

[58] Field of Search ...................................... 250/483.1

[56] References Cited

U.S. PATENT DOCUMENTS 4,239,968 12/1980 Kotera et al. .................... 250/327.2

4,259,588 3/1981 Luckey et al. ................... 250/483.1

4,261,854 4/1981 Kotera et al. ................ 250/327.2 X 4,380,702 4/1983 Takahashi et al. ............... 250/327.2

*Primary Examiner*—James R. Hoffman

*Attorney, Agent, or Firm*—Gerald J. Ferguson, Jr.; James E. Bryan; Michael P. Hoffman

[57] ABSTRACT

A radiographic intensifying screen comprising a support, a phosphor layer which comprises a binder and a phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

6 Claims, 3 Drawing Figures

RADIOGRAPHIC INTENSIFYING SCREEN

BACKGROUND OF THE INVENTION

1. Field of the Invention

The present invention relates to a radiographic intensifying screen and, more particularly, to a radiographic intensifying screen comprising a support, a phosphor layer which comprise a binder and a phosphor dispersed therein and a light-reflecting layer containing a white pigment provided between the support and the phosphor layer.

2. Description of the Prior Art

In a variety of radiography such as medical radiography for diagnosis and industrial radiography for nondistructive inspection, a radiographic intensifying screen is generally employed in close contact with one or both surfaces of a radiographic film such as an X-ray film for enhancing the radiographic speed of the system. The radiographic intensifying screen consists essentially of a support and a phosphor layer provided thereon. Further, a transparent film is generally provided on the free surface of the phosphor layer (a surface not facing the support) to keep the phosphor layer from chemical deterioration and physical shocks.

The phosphor layer comprises a binder and phosphor particles dispersed therein. When excited with a radiation such as X-rays having passing through an object, the phosphor particles emit light of high luminance (spontaneous emission) in proportion to the dose of the radiation. Accordingly, the radiographic film placed in close contact with the phosphor layer can be exposed sufficiently to form a radiation image of the object, even if the radiation is applied to the object at a relatively small dose.

It is desired for a radiographic intensifying screen to exhibit a high radiographic speed and to provide an image of high quality (i.e., high sharpness, high graininess, etc.). There has been conventionally proposed a variety of intensifying screens improved in the radiographic speed or the quality of the image provided thereby.

For enhancing the radiographic speed of a radiographic intensifying screen, it has been known that a light-reflecting layer is provided between the support and the phosphor layer, for instance, by coating a dispersion comprising a binder and a white pigment on the support to form a light-reflecting layer and subsequently forming the phosphor layer on the light-reflecting layer. Examples of the white pigment employable in the light-reflecting layer have included titanium dioxide, white lead, zinc sulfide, aluminum oxide and magnesium dioxide.

For instance, when a phosphor which emits light in the near ultraviolet region as well as the visible region, such as a divalent europium activated alkaline earth metal fluorohalide phosphor (which has an emission intensity in the near ultraviolet region higher than that in the visible region) is employed for the radiographic intensifying screen, the light-reflecting layer containing one of the above-mentioned white pigments other than magnesium oxide does not show sufficiently high reflection characteristics and the radiographic speed of the intensifying screen is not enhanced to a satisfactory level. That is because such white pigments other than magnesium oxide show considerably low reflectance in the near ultraviolet region, though which show high reflectance in the visible region (in other words, they do not show the reflection spectra in the near ultraviolet region).

Among the above-mentioned white pigments, titanium dioxide is industrially prepared by the sulfate process (Norway Method) or the chloride process, while magnesium oxide is industrially prepared by calcining magnesium carbonate or magnesium hydroxide. Thus prepared white pigments are in the form of particles having small size, usually not more than 1 μm. A pigment having such a small particle size is poor in dispersibility in a binder solution for the formation of light-reflecting layer, and the surface of the resulting light-reflecting layer tends to show poor smoothness, owing to the aggregation of the pigment particles on the surface of the layer. Such a light-reflecting layer having poor smoothness brings about difficulty in the formation of a phosphor layer with an even thickness thereon.

SUMMARY OF THE INVENTION

An object of the present invention is to provide a radiographic intensifying screen having a light-reflecting layer containing a white pigment which has the excellent light-reflection characteristics and sufficient dispersibility.

The object is accomplished by a radiographic intensifying screen of the present invention comprising a support, a phosphor layer which comprises a binder and a phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

DETAILED DESCRIPTION OF THE INVENTION

Figure 1:
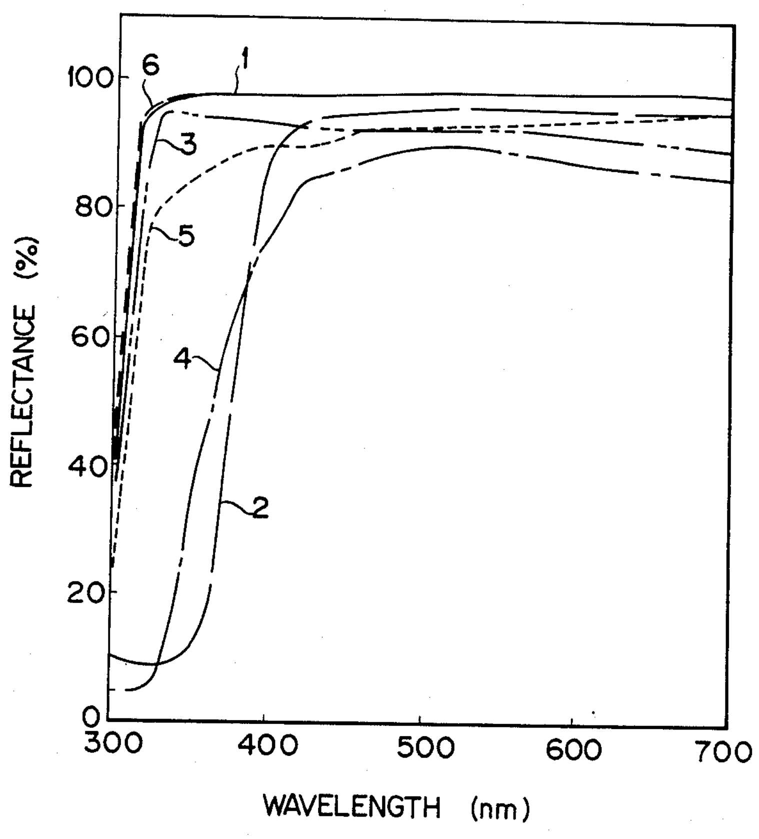
FIG. 1 shows a reflection spectrum of the light-reflecting layer containing BaFBr in the radiographic intensifying screen of the present invention (Curve 1), and reflection spectra of light-reflecting layers containing the known white pigments (Curves 2 to 6).

According to the present invention, the radiographic speed of the radiographic intensifying screen is enhanced by providing a light-reflecting layer containing an alkaline earth metal fluorohalide having the above-mentioned formula on the support of the intensifying screen.

In the radiography, when a radiation having passed through an object enters a phosphor layer of a radiographic intensifying screen, the phosphor particles contained in the phosphor layer absorb the radiation energy to turn into the excited state and immediately emit light (spontaneous emission) in the near ultraviolet to visible region. The phosphor particles emit light in no special direction but in all directions, and a part of the light directly enters a radiographic film to contribute to the formation of a visible image.

Another part of the emitted light advancing towards the interface between the phosphor layer and the support (in the opposite direction of the radiographic film) is reflected by the interface to enter the radiographic film and also to contribute to the formation of the visible image, except a portion to be absorbed by the support or passing through the support. Therefore, unless a light-reflecting layer is provided between the support and the phosphor layer in a radiographic intensifying screen, most portion of the emitted light advancing towards the interface between the phosphor layer and the support may be absorbed by the support to vanish or pass through the support to scatter away, so that the radiographic speed of the intensifying screen is liable to decrease.

Particularly in the case that a phosphor showing emission in the near ultraviolet to visible region such as the above-mentioned divalent europium activated alkaline earth metal fluorohalide phosphor is employed as a phosphor of the radiographic intensifying screen, a light-reflecting layer formed on a support is desired to have excellent light-reflection characteristics in the near ultraviolet to visible region. That is, a white pigment employable for the light-reflecting layer is desired to have excellent light-reflection characteristics in the near ultraviolet to visible region.

It is further desired that a white pigment employed for the light-reflecting layer is relatively large in the particle size so as to be sufficiently dispersed in a binder solution without occurrence of aggregation. As mentioned hereinbefore, a white pigment having a small particle size shows low dispersibility in the binder solution and the surface of the resulting light-reflecting layer is liable to have poor smoothness caused by aggregation of the white pigment. Such light-reflecting layer having poor smoothness of the surface brings about difficulty in the formation of a phosphor layer of even thickness thereon. Otherwise, for preventing the decrease of the dispersibility of white pigment in the binder solution to enhance the smoothness of the surface of light-reflecting layer, it is necessary to prepare a coating dispersion for the formation of the light-reflecting layer using a specific dispersing apparatus or to dry a coating layer thereof over a long period of time, and in such cases the procedure is very complicated.

The present inventor has discovered that the alkaline earth metal fluorohalide having the aforementioned formula shows the excellent light-reflection characteristics, that is, said fluorohalide shows the high reflectance in the near ultraviolet (up to the wavelength of 320 nm) to visible region, and that the alkaline earth metal fluorohalide shows the high dispersibility in the light-reflecting layer since it can be prepared in the form of particles with relatively large particle size.

More in detail, according to the studies of the present inventor, the decrease of radiographic speed of a radiographic intensifying screen, arising from absorption by a support or from trasmission through the support of the emitted light which advances towards the interface between a phosphor layer and the support, can be remarkably suppressed by providing a light-reflecting layer containing the alkaline earth metal fluorohalide on the support. Especially when a phosphor showing emission in the near ultraviolet to visible region such as the aforementioned divalent europium activated alkaline earth metal fluorohalide phosphor is employed in the phosphor layer, the radiographic speed of the resulting radiographic intensifying screen can be prominently enhanced by providing a light-reflecting layer containing the alkaline earth metal fluorohalide.

It has been further discovered that the alkaline earth metal fluorohalide can be usually prepared in a relatively large particle size, and in the case of employing such alkaline earth metal fluorohalide as a white pigment in the light-reflecting layer, a light-reflecting layer showing the excellent dispersibility of the white pigment is obtained, so that a phosphor layer having even thickness can be formed on the light-reflecting layer.

Heretofore, it has been never known that the above-mentioned alkaline earth metal fluorohalide can be employed as the light-reflecting material. The present inventor has studied on the divalent europium activated alkaline earth metal fluorohalide phosphor and discovered that the alkaline earth metal fluorohalide, namely, a host material of the phosphor, can be employed as a light-reflecting material suitably contained in the light-reflecting layer of the radiographic intensifying screen.

As described above, the radiographic intensifying screen of the present invention is enhanced in the radiographic speed. This means that a thickness of the phosphor layer can be made small when the intensifying screen is so designed as to have the radiographic speed at a predetermined level, and as a result, the intensifying screen can give an image improved in the sharpness.

The radiographic intensifying screen of the present invention having the preferable characteristics as described above can be prepared, for instance, in the following manner.

The support material employed in the present invention can be selected from those employed in the conventional radiographic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material.

On the support an adhesive layer may be provided by coating a polymer material such as gelatin over the surface of the support (on the light-reflecting layer side) su as to enhance the bonding between the support and the light-reflecting layer provided thereon.

The light-reflecting layer, that is a characteristic requisite of the present invention, comprises a binder and a powdery alkaline earth metal fluorohalide dispersed therein.

The alkaline earth metal fluorohalide employable in the present invention is prepared, for instance, in the manner as described below.

An alkaline earth metal halide (at least one halide selected from the group consisting of barium bromide, barium chloride, strontium bromide, strontium chloride, calcium bromide and calcium chloride) is dissolved in a distilled water. To the solution is added an alkaline earth metal fluoride (at least one fluoride selected from the group consisting of barium fluoride, strontium fluoride and calcium fluoride) in an amount of the same molar as the above alkaline earth metal halide, and they are sufficiently mixed. The mixture is heated at an appropriate temperature (e.g. approx. 80° C.) under stirring to dryness under reduced pressure to obtain a powdery alkaline earth metal fluorohalide.

Thus prepared alkaline earth metal fluorohalide powder generally has a particle size ranging from 1 to 10 μm, and particularly approx. 90% of the powder has a particle size ranging from 2 to 5 μm.

A among the aforementioned white pigments, titanium dioxide and magnesium oxide both particularly are composed of particles of a small size, and the particle sizes thereof are generally not more than 1 μm. On the other hand, the alkaline earth metal fluorohalide prepared by the above-described process comprises particles of a large and even size, so that it shows the excellent dispersibility in the binder solution. Accordingly, the employment of the alkaline earth metal fluorohalide is effective to provide a light-reflecting layer having a highly smooth surface. Further, since the alkaline earth metal fluorohalide has a high covering power and a high refractive index, it can easily scatter the light by reflection or refraction, and therefore, the radiographic speed of the resulting radiographic intensifying screen is remarkably enhanced.

Furthermore, the reflection spectrum of the alkaline earth metal fluorohalide is shown in the near ultraviolet to visible region (in the wavelength region longer than 320 nm), and particularly in the near ultraviolet region ranging from 320 to 450 nm, the alkaline earth metal fluorohalide has such a high reflectance as is unobtainable by any of titanium dioxide, white lead, zinc sulfide and aluminum oxide which have been conventionally employed in the light-reflecting layer.

Accordingly, the alkaline earth metal fluorohalide is particularly suitable for employment as the light-reflecting material for the light-reflecting layer of the radiographic intensifying screen having a phosphor layer containing a phosphor which emits light having a wavelength in the near ultraviolet to visible region.

Among the above-described alkaline earth metal fluorohalide, particularly preferred in the present invention is a barium fluorohalide having the formula BaFX, in which X is at least one halogen selected from the group consisting of Cl and Br, from the viewpoint of the covering power or the like.

The light-reflecting layer can be prepared by the following procedures. The above-mentioned alkaline earth metal fluorohalide and a binder are added to an appropriate solvent, and they are sufficiently mixed to prepare a coating dispersion containing the alkaline earth metal fluorohalide homogeneously dispersed in the binder solution. The coating dispersion is evenly applied onto the surface of the support (or the surface of an adhesive layer provided on the support) to form a coating layer. Then the coating layer is heated to dryness so as to form the light-reflecting layer on the support. As described hereinbefore, the alkaline earth metal fluorohalide is in the form of particles with a relatively large size and is well dispersible in the binder solution, so that the light-reflecting layer formed on the support has a surface of high smoothness.

The binder and the solvent employable for the preparation of the light-reflecting layer can be selected from binders employable for the preparation of the phosphor layer which will be described hereinafter.

The mixing ratio between the binder and the alkaline earth metal fluorohalide to be contained in the coating dispersion is generally within the range of from 1:1 to 1:50, by weight. The binder is preferably contained in a small amount from the viewpoint of the light-reflection characteristics of the resulting light-reflecting layer, and considering easiness of the formation thereof as well as the light-reflection characteristics, the mixing ratio is preferably within the range of from 1:2 to 1:20, by weight. The thickness of the light-reflecting layer is preferably within the range of 5 to 100 μm.

Other white pigments may be employed in conjunction with the alkaline earth metal fluorohalide as the light-reflecting material for the light-reflecting layer.

As described in Japanese Patent Provisional Publication No. 58(1983)-182599, (corresponding to allowed U.S. patent application Ser. No. 496,278, now U.S. Pat. No. 4,575,635, and European Patent Publication No. 92241), the phosphor layer-side surface of the light-reflecting layer may be provided with protruded and depressed portions for enhancement of the sharpness of the image.

On the light-reflecting layer prepared as described above, a phosphor layer are formed. The phosphor layer comprises a binder and phosphor particles dispersed therein.

A variety of phosphors employable for a radiographic intensifying screen have been known, and any one of them can be used in the present invention. Examples of the phosphor preferably employable in the present invention include:

tungstate phosphors such as $CaWO_4$, $MgWO_4$, and $CaWO_4$: Pb;

terbium activated rare earth oxysulfide phosphors such as $Y_2O_2S$:Tb, $Gd_2O_2S$:Tb, $La_2O_2S$:Tb, $(Y,Gd)_2O_2S$:Tb, and $(Y,Gd)_2O_2S$:Tb,Tm;

terbium activated rare earth phosphate phosphors such as $YPO_4$:Tb, $GdPO_4$:Tb and $LaPO_4$:Tb;

terbium activated rare earth oxyhalide phosphors such as LaOBr:Tb, LaOBr:Tb,Tm, LaOCl:Tb, LaOCl:Tb,Tm, GdOBr:Tb, and GdOCl:Tb;

thulium activated rare earth oxyhalide phosphors such as LaOBr:Tm and LaOCl:Tm;

barium sulfate phosphors such as $BaSO_4$:Pb, $BaSO_4$:$Eu^{2+}$, and $(Ba,Sr)SO_4$:$Eu^{2+}$;

divalent europium activated alkaline earth metal fluorohalide phosphors such as BaFCl:$Eu^{2+}$, BaFBr:$Eu^{2+}$, BaFCl:$Eu^{2+}$,Tb, BaFBr:$Eu^{2+}$,Tb, $BaF_2.BaCl_2.KCl$:$Eu^{2+}$, $BaF_2.BaCl_2.xBaSO_4.KCl$:$Eu^{2+}$, and $(Ba,Mg)F_2.BaCl_2.KCl$:$Eu^{2+}$;

iodide phosphors such as CsI:Na, CsI:Tl, NaI:Tl, and KI:Tl;

sulfide phosphors such as ZnS:Ag, (Zn,Cd)S:Ag, (Zn,Cd)S:Cu, and (Zn,Cd)S:Cu,Al; and hafnium phosphate phosphors such as $HfP_2O_7$:Cu.

Among the above-discribed phosphors, the divalent europium activated alkaline earth metal fluorohalide phosphor and cerium activated rare earth oxyhalide phosphor are particularly preferred, because the light emitted thereby is efficiently reflected. However, the above-described phosphors are given by no means to restrict the phosphor employable in the present invention. Any other phosphors can also be employed, provided that the phosphor emits light having a wavelength within near ultraviolet to visible region when exposed to a radiation such as X-rays.

There has been filed by the present applicant (or assignee) a patent application with respect to the radiographic intensifying screen having two phosphor layers which comprises a first phosphor layer provided on the support containing at least one terbium activated rare earth oxysulfide phosphor; and a second phosphor layer provided on the first phosphor layer containing at least one divalent europium activated barium fluorohalide phosphor (Japanese Patent Application No. 57(1982)-158047). The light-reflecting layer according to the present invention can be applied to such radiographic intensifying screen having two phosphor layers.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the light-reflecting layer, for instance, by the following procedure.

In the first place, phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the amount of the binder and the amount of the phosphor in the coating dispersion may be determined according to the characteristics of the aimed radiographic intensifying screen and the nature of the phosphor employed. Generally, the ratio therebetween is within the range of from 1:1 to 1:100 (binder : phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiographic intensifying screen, the nature of the phosphor, the ratio between the binder and the phosphor, etc. Generally, the thickness of the phosphor layer is within a range of from 20 μm to 1 mm, preferably from 50 to 500 μm.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The radiographic intensifying screen generally has a transparent protective film on a free surface of a phosphor layer to protect the phosphor layer from physical and chemical deterioration. In the present invention, it is preferable to provide a protective film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 3 to 20 μm.

The following examples further illustrate the present invention, but these examples are by no means understood to restrict the invention. In the following examples, the invention is illustrated with respect to a radiographic intensifying screen having a light-reflecting layer containing barium fluorobromide (BaFBr), but it has been confirmed that radiographic intensifying screens having a light-reflecting layer containing an alkaline earth metal fluorohalide other than BaFBr have almost the same results as given in Example 2.

EXAMPLE 1

333.19 g. of barium bromide ($BaBr_2.2H_2O$) was dissolved in 300 ml. of distilled water ($H_2O$) to prepare a solution. To the solution, 175.34 g. of barium fluoride ($BaF_2$) was added and mixed to give a suspension. The suspension was heated at 80° C. under reduced pressure and under stirring in a rotary evaporator to dryness, to obtain a barium fluorobromide powder (BaFBr) in which approx. 90% thereof had a particle size ranging from 2 to 5 μm.

To a mixture of the barium fluorobromide and a linear polyester resin were added methyl ethyl ketone and nitrocellulose (nitrification degree: 11.5%), and they were sufficiently stirred by means of homogenizer to prepare a homogeneous coating dispersion containing the barium fluorobromide and the binder in the ratio of 1:10 (binder : fluorobromide, by weight) and having a viscosity of 25-35 PS (at 25° C.).

Subsequently, the coating dispersion was applied to a plastic sheet placed horizontally on a glass plate by using a doctor blade. After the uniform coating was complete, the sheet having the coating dispersion was heated to dryness. Thus, a light-reflecting layer containing barium fluorobromide and having a thickness of 50 μm was formed on the sheet.

It was confirmed that the barium fluorobromide particles were sufficiently dispersed in the light-reflecting layer and aggregation of particles was not observed, and that the surface of the light-reflecting layer had high smoothness.

COMPARISON EXAMPLE 1

(a) A light-reflecting layer of the same thickness containing titanium dioxide was formed on the sheet in the same manner as described in Example 1 except that titanium dioxide (anatase-type $TiO_2$ with a particle size ranging from 0.10 to 0.25 μm; TITONE A-110 manufactured by Sakai Chemical Industry Co. Ltd.) was employed in place of barium fluorobromide.

(b) A light-reflecting layer of the same thickness containing white lead was formed on the sheet in the same manner as described in Example 1 except that commercially available white lead [$2PbCO_3.Pb(OH)_2$] was employed in place of barium fluorobromide.

(c) A light-reflecting layer of the same thickness containing zinc sulfide was formed on the sheet in the same manner as described in Example 1 except that commercially available zinc sulfide (ZnS) was employed in place of barium fluorobromide.

(d) A light-reflecting layer of the same thickness containing aluminum oxide was formed on the sheet in the same manner as described in Example 1 except that aluminum oxide ($Al_2O_3$, a mean particle size: 5 μm; manufactured by Buehler Ltd.) was employed in place of barium fluorobromide.

(e) A light-reflecting layer of the same thickness containing magnesium oxide was formed on the sheet in the same manner as described in Example 1 except that commercially available magnesium oxide (MgO) was employed in place of barium fluorobromide.

Among the prepared light-reflecting layers, both the light-reflecting layer containing $2PbCO_3.Pb(OH)_2$ (Com. Example 1-b) and light-reflecting layer containing ZnS (Com. Example 1-c) showed the dispersibility (of the white pigments) as high as that containing BaFBr of Example 1 did. and had the surface of satisfactory smoothness. However, in both the light-reflecting layer containing $TiO_2$ (Com. Example 1-a) and light-reflecting layer containing MgO (Com. Example 1-e), the aggregated particles of the white pigments were observed, and their surfaces had poor smoothness especially owing to aggregation of the particles in the vicinity of the surfaces thereof.

The light-reflecting layers prepared in Example 1 and Comprison Example 1 were measured on the lightreflectance by means of a spectrophotometer (Hitachi Auto-Recording Spectrophotometer type 330).

The results are graphically shown in FIG. 1.

In FIG. 1,

Curve 1 shows a reflection spectrum of the light-reflecting layer containing BaFBr (Example 1), Curve 2 shows a reflection spectrum of the light-reflecting layer containing $TiO_2$ (Com. Example 1-a), Curve 3 shows a reflection spectrum of the light-reflecting layer containing $2PbCO_3.Pb(OH)_2$ (Com. Example 1-b), Curve 4 shows a reflection spectrum of the light-reflecting layer containing ZnS (Com. Example 1-c), Curve 5 shows a reflection spectrum of the light-reflecting layer containing $Al_2O_3$ (Com. Example 1-d), and Curve 6 shows a reflection spectrum of the light-reflecting layer containing MgO (Com. Example 1-e).

As is evident from the results indicated by Curves 1 to 6 shown in FIG. 1, the light-reflecting layer containing BaFBr of the radiographic intensifying screen according to the present invention shows the reflection spectrum in the wavelength region shorter than those of the light-reflecting layers containing $TiO_2$, $2PbCO_3.Pb(OH)_2$, ZnS and $Al_2O_3$, respectively. Moreover, the reflection spectrum of the light-reflecting layer containing BaFBr is similar to that of the light-reflecting layer containing MgO, and has the excellent reflection characteristics in the near ultraviolet to visible region ranging from 320 to 450 nm.

EXAMPLE 2

To a mixture of the particulate barium fluorobromide prepared in Example 1 and polyurethane were added toluene and ethanol, and they were sufficiently stirred by means of homogenizer to prepare a homogeneous coating dispersion containing the barium fluorobromide and the binder in the ratio of 1:10 (binder : fluorobromide, by weight) and having a viscosity of 25–35 PS (at 25° C.).

Subsequently, the coating dispersion was applied onto a polyethylene terephthalate sheet (support, thickness: 250 μm) placed horizontally on a glass plate by using a doctor blade. After the uniform coating was complete, the support having said coating dispersion was heated at a temperature gradually rising from 25° to 100° C. Thus, a light-reflecting layer having a thickness of approx. 40 μm was formed on the support. The barium fluorobromide particles were sufficiently dispersed in the light-reflecting layer and the surface thereof had high smoothness.

Then, to a mixture of a particulate divalent europium activated barium fluorbromide phosphor ($BaFBr:Eu^{2+}$) and a linear polyester resin were added successively methyl ethyl ketone and nitrocellulose (nitrification degree: 11.5%), to prepare a dispersion containing the binder and the phosphor particles in the ratio of 1:20 (binder : phosphor, by weight). Tricresyl phosphate, nbutanol and methyl ethyl ketone were added to the dispersion and the mixture was sufficiently stirred by means of a propeller agitater to obtain a homogeneous coating dispersion having a viscosity of 25–35 PS (at 25° C.).

The coating dispersion was applied onto the light-reflecting layer in the same manner as described above to form a phosphor layer having a thickness of approx. 150 μm.

On the phosphor layer was placed a transparent polyethylene terephthalate film (thickness: 12 μm; provided with a polyester adhesive layer) to combine the transparent film and the phosphor layer through the adhesive layer. Thus, a radiographic intensifying screen consisting essentially of a support, a light-reflecting layer, a phosphor layer and a transparent protective film was prepared.

Further, a variety of radiographic intensifying screens were prepared, varying the thickness of phosphor layer within the range of 20–250 μm. The prepared intensifying screens were named Screens A.

COMPARISON EXAMPLE 2

As a support, a polyethylene terephthalate sheet containing carbon black (thickness: 250 μm) was prepared.

The procedure of Example 2 was repeated except that the phosphor layer was directly provided on the so prepared support without provision of the light-reflecting layer, to prepare a radiographic intensifying screen consisting essentially of a support, a phosphor layer and a transparent protection film.

Further, a variety of radiographic intensifying screens were prepared, varying the thickness of phosphor layer within the range of 20–250 μm. The prepared intensifying screens were named Screens B.

The radiographic intensifying screens (Screens A and B) prepared as described above were evaluated on the radiographic speed thereof and the sharpness of the image provided thereby according to the following test.

(1) Radiographic speed

The radiographic intensifying screen was exposed to X-rays at voltage of 80 KVp and the light emitted by the intensifying screen was detected by means of the above-mentioned photosensor to measure the radiographic speed thereof.

(2) Sharpness of image

The radiographic intensifying screen was combined with an X-ray film in a cassette, and exposed to X-rays at voltage of 80 KVp through an MTF chart. The film was then developed to obtain a visible image, and the modulation transfer function (MTF) value of the visible image was determined. The MTF value was given as a value (%) at the spatial frequency of 2 cycle/mm.

Figure 2:
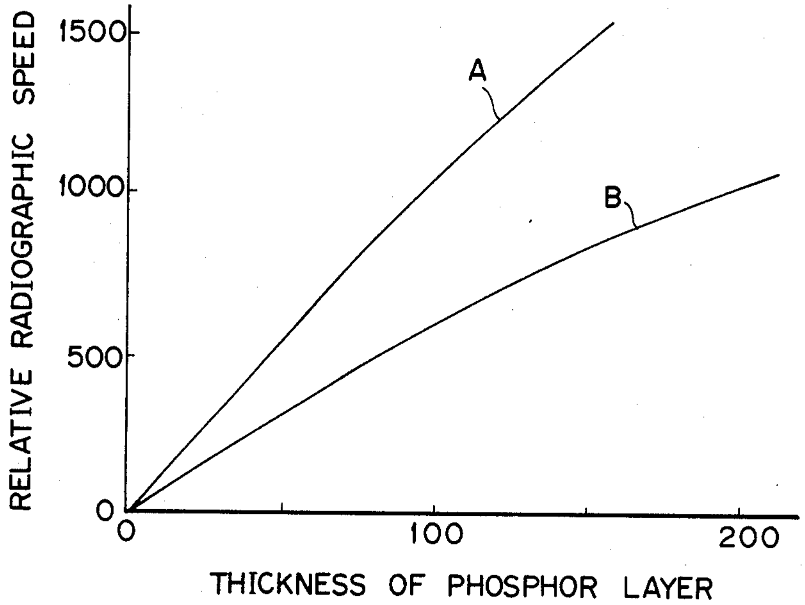
FIG. 2 graphically illustrates a relationship between a thickness of the phosphor layer and a relative radiographic speed in the radiographic intensifying screen of the present invention (Curve A) and a relationship therebetween in the known radiographic intensifying screen (Curve B).
Figure 3:
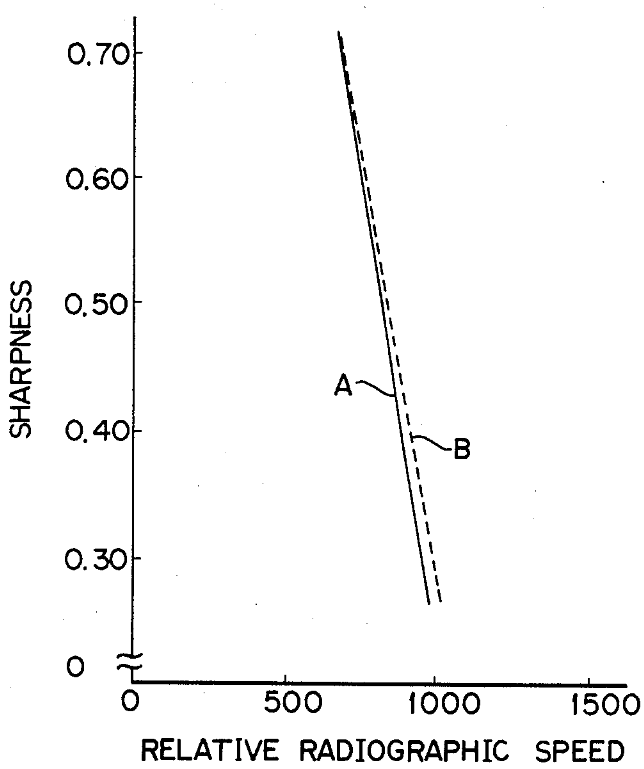
FIG. 3 graphically illustrates relationships between a relative radiographic speed and a sharpness in the radiographic intensifying screens shown in FIG. 2.

The results of the evaluation on the radiographic intensifying screens are graphically shown in FIG. 2 and FIG. 3.

In FIG. 2,

Curve A shows a relationship between a thickness of phosphor layer and a sharpness with respect to Screen A, in which the light-reflecting layer containing barium fluorobromide is provided, and Curve B shows a relationship between a thickness of phosphor layer and a sharpness with respect to Screen B, in which the support contains carbon black and the light-reflecting layer is not provided.

In FIG. 3,

Curve A shows a relationship between a relative radiographic speed and a sharpness with respect to Screen A, and Curve B shows a relationship between a relative radiographic speed and a sharpness with respect to Screen B.

As is evident from the results indicated by Curves A and B shown in FIG. 2, the radiographic intensifying screen of the present invention having the light-reflecting layer containing barium fluorobromide shows the higher radiographic speed than that not having the light-reflecting layer.

Moreover, as is evident from the results indicated by Curves A and B shown in FIG. 3, the radiographic intensifying screen of the present invention having the light-reflecting layer containing barium fluorobromide provides an image of the same sharpness as that having the support containing carbon black for enhancing the sharpness, when the comparison is made on the same radiographic speed level basis.

What is claimed is:

1. A radiographic intensifying screen comprising a support, a phosphor layer which comprises a binder and a phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

2. The radiographic intensifying screen as claimed in claim 1, in which said alkaline earth metal fluorohalide has a particle size within the range of from 1 to 10 μm.

3. The radiographic intensifying screen as claimed in claim 1, in which said alkaline earth metal fluorohalide is a barium fluorohalide represented by the formula BaFX, in which X is at least one halogen selected from the group consisting of Cl and Br.

4. The radiographic intensifying screen as claimed in any one of claims 1 through 3, in which said phosphor emits light in the near ultraviolet to visible region.

5. The radiographic intensifying screen as claimed in claim 4, in which said phosphor which emits light in the near ultraviolet to visible region is a divalent europium activated alkaline earth metal fluorohalide phosphor.

6. The radiographic intensifying screen as claimed in any one of claims 1 through 3, in which said phosphor layer comprises a first phosphor layer provided on said light-reflecting layer containing a terbium activated rare earth oxysulfide phosphor; and a second phosphor layer provided on the first phosphor layer containing a divalent europium activated barium fluorohalide phosphor.

* * * * *